United States Patent

Kubota et al.

Patent Number: 4,635,274
Date of Patent: Jan. 6, 1987

[54] BIDIRECTIONAL DIGITAL SIGNAL COMMUNICATION SYSTEM

[75] Inventors: Ichiro Kubota; Masakatsu Toyoshima, both of Tokyo, Japan

[73] Assignee: Sony Corporation, Tokyo, Japan

[21] Appl. No.: 727,356

[22] Filed: Apr. 25, 1985

[30] Foreign Application Priority Data

Apr. 27, 1984 [JP] Japan ................................ 59-86762

[51] Int. Cl.$^4$ ............................................. H04K 1/00
[52] U.S. Cl. ...................................... 375/1; 375/115; 370/107
[58] Field of Search ............................ 375/1, 2.1, 115; 455/26, 27, 28; 370/107; 343/5 PN; 178/22.01

[56] References Cited

U.S. PATENT DOCUMENTS

| 4,351,064 | 9/1982 | Ewanus | 375/1 |
| 4,426,712 | 1/1984 | Gorski-Popiel | 375/115 |
| 4,517,679 | 5/1985 | Clark | 375/115 |
| 4,532,635 | 7/1985 | Mangulis | 375/1 |

Primary Examiner—Robert L. Griffin
Assistant Examiner—Stephen Chin
Attorney, Agent, or Firm—Lewis H. Eslinger; Alvin Sinderbrand

[57] ABSTRACT

A bidirectional digital signal communication system includes a plurality of terminal units in communication with a center unit. Each of the terminal units includes a signal generator for generating digital data spread with a PN (pseudo-noise) code, a modulator for modulating the digital data on a carrier, and a transmitter for transmitting the modulated digital signal to the center unit through a transmission line. The center unit includes a receiver for receiving the modulated digital signal, a PN code generator for locally generating a PN code which corresponds to the transmitted PN code, a multiplier supplied with outputs of the receiver and the PN code generator to produce a digital signal de-spread from the PN code, a demodulator connected to the multiplier to reproduce the digital data from the modulated digital signal, and a memory for storing the PN code when the signal level of the multiplier exceeds a predetermined value. The stored PN code is retrieved from the memory to enable rapid synchronization with the next transmission received from the terminal unit.

11 Claims, 22 Drawing Figures

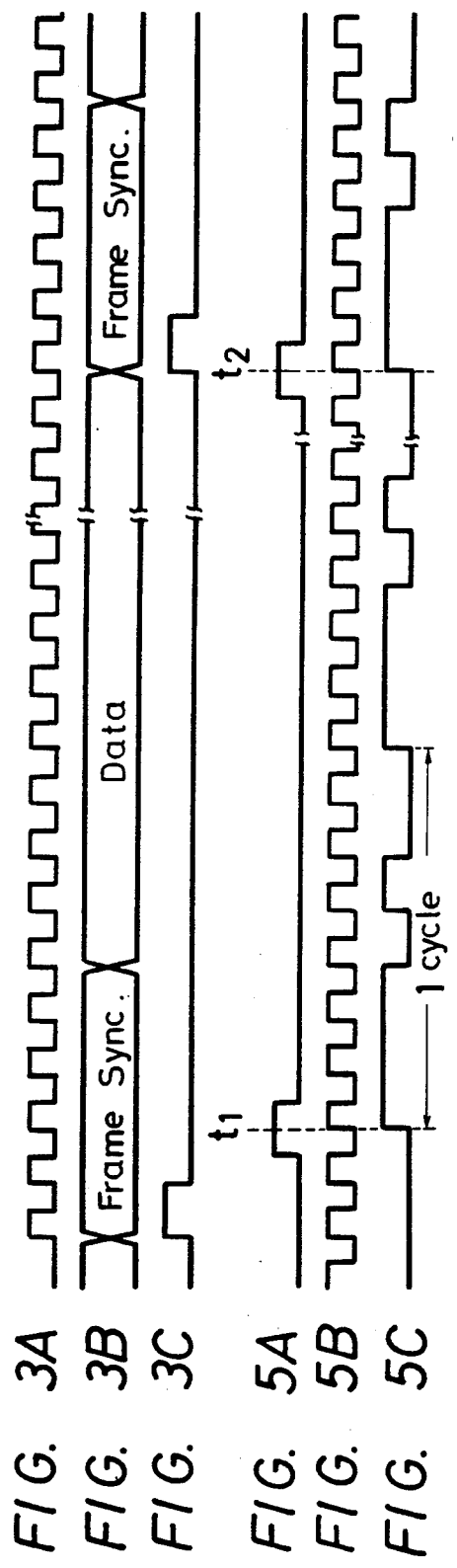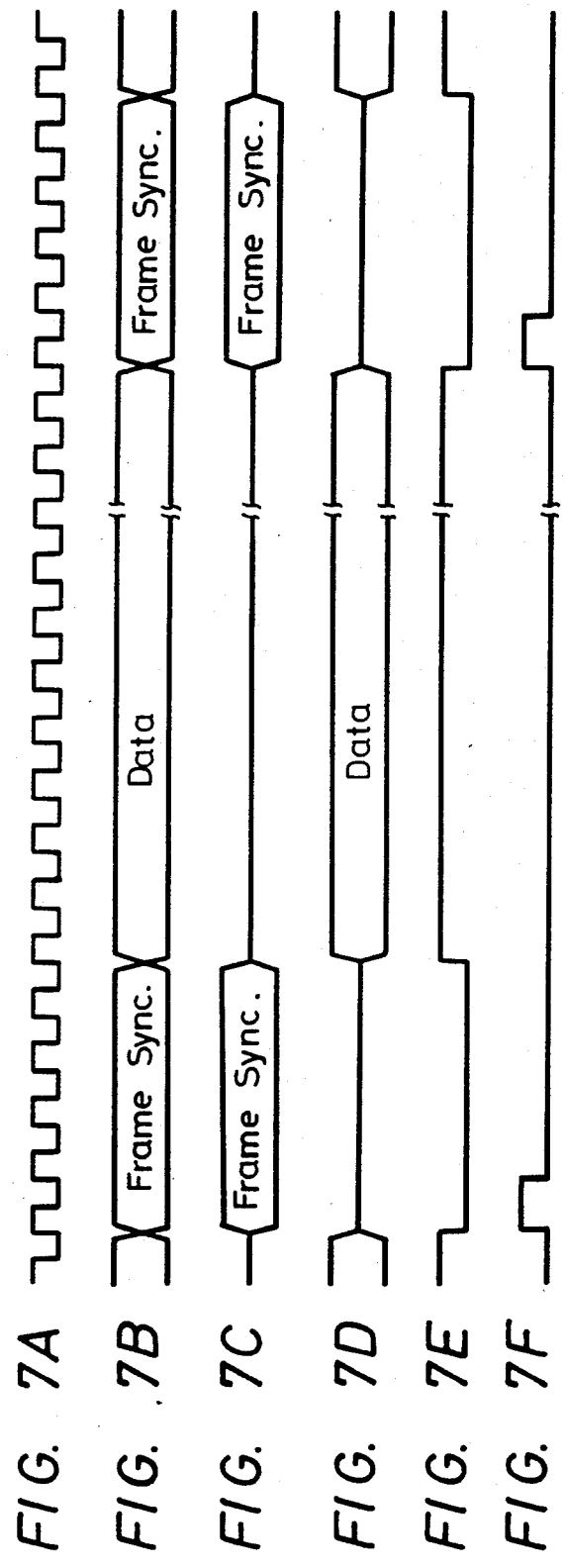

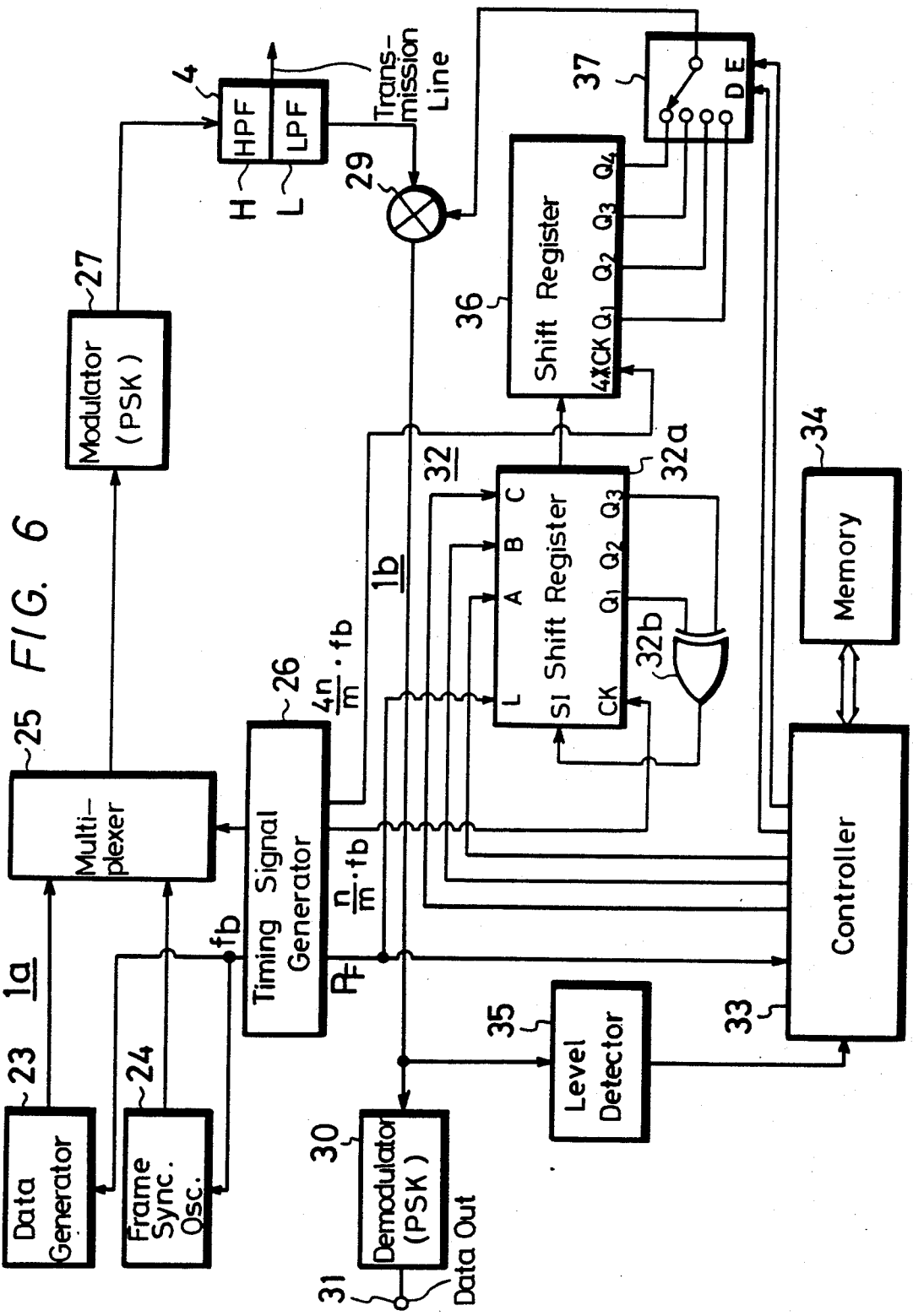

FIG. 8A
FIG. 8B
FIG. 8C
FIG. 8D
FIG. 8E
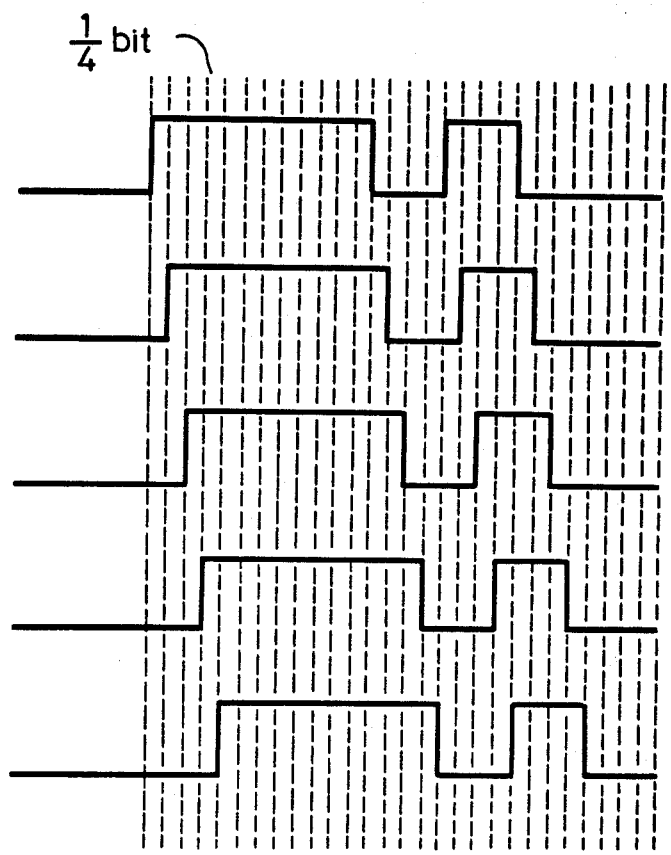
FIG. 9
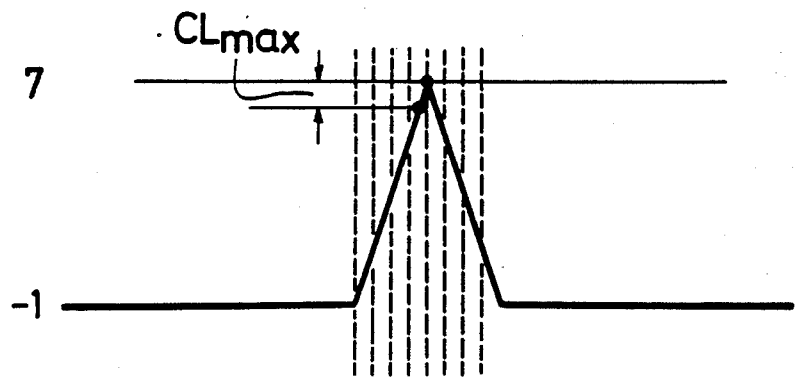

BIDIRECTIONAL DIGITAL SIGNAL COMMUNICATION SYSTEM

BACKGROUND OF THE INVENTION

1. Field of the Invention

This invention relates to a bidirectional digital signal communication system and, more particularly, to a novel and highly-effective bidirectional digital signal communication system especially adapted for use in transmitting a digital data signal through a CATV (cable television) transmission line and similar communication links.

2. Description of the Prior Art

Generally, in a bidirectional digital signal communication system, a digital information or data signal is transmitted from a center unit (broadcasting station) through a "down" transmission line ("down-link") to each terminal unit, and each terminal unit transmits a digital data signal through an "up" transmission line ("up-link") to the center unit.

In the case of transmission through the up-link, in order to prevent deterioration of the S/N (signal-to-noise) ratio due to heat generated by a resistor in the last stage of the terminal unit, etc., the data signal and a pseudo-noise (PN) code are multiplied with each other. This produces a so-called "spread spectrum" encoding the data signal. The data multiplied by the PN code has a wide frequency spectrum so that it is less affected by noise during transmission than it would otherwise be. The data as encoded in the spread spectrum is transmitted in the form, for example, of a PSK-modulated signal (i.e., a signal modulated by phase shift keying).

In a bidirectional digital signal communication system using a spread spectrum for the transmission of data, it is necessary that the receiver of the center unit accurately synchronize the position (phase) of the code pattern of a received signal and the pulse repetition rate or frequency of the bit clock, both of which are transmitted from the terminal unit, with those of a reference signal in the receiver of the center unit.

However, the process of synchronization requires a predetermined time, and, if the synchronization process is carried out each time the polling of the terminal units is conducted by the center unit, the amount of data receivable from the terminal units per unit of time is substantially reduced, so that the transmission efficiency is lowered.

OBJECTS AND SUMMARY OF THE INVENTION

An object of the invention is to provide a bidirectional digital signal communication system in which a terminal unit can be accessed by a center unit within a minimum period of time and the amount of data receivable from the terminal units per unit of time is increased, so that the transmission efficiency is raised.

Another object of the invention is to provide a bidirectional digital signal communication system which uses a spread spectrum when a digital data signal is transmitted from each terminal unit to the center unit, thereby minimizing deterioration of the S/N ratio.

A further object of the invention is to provide a bidirectional digital signal communication system in which a center unit is provided with a memory for storing therein a PN (pseudo-noise) code which corresponds to a PN code generated in the terminal unit and with circuits responsive to the stored code for achieving rapid synchronization with the next transmission from the transferred unit.

According to an aspect of the present invention, there is provided a bidirectional digital signal communication system including a plurality of terminal units in communication with a center unit, wherein each of the terminal units comprises: signal generating means for generating digital data spread with a PN code; modulating means for modulating the digital data on a carrier; and means for transmitting the modulated digital signal to the center unit; and the center unit comprises: receiving means for receiving the modulated digital signal; a PN code generator for generating a PN code which corresponds to the PN code of one of the terminal units; a multiplier responsive to the receiving means and the PN code generator to produce a digital signal de-spread from the PN code; demodulating means connected to the multiplier to reproduce the digital data from the modulated digital signal; and a memory for storing the PN code when the signal level of the multiplier exceeds a predetermined value.

BRIEF DESCRIPTION OF THE DRAWINGS

A better understanding of the objects, features and advantages of the invention may be gained from a consideration of the following detailed description of the preferred embodiment thereof, taken in conjunction with the accompanying figures of the drawings, wherein like reference characters designate like elements and parts and wherein:

FIGS. 3A to 3C are respectively waveform diagrams of a bit clock, a data signal and a synchronizing signal transmitted from the center unit to the terminal units through the down-link in accordance with the invention;

FIGS. 5A to 5C are respectively waveform diagrams of a synchronizing signal, a clock signal and a PN code which are transmitted from a terminal unit to the center unit through the up-link in accordance with the invention;

FIG. 6 is a circuit block diagram of a preferred embodiment of a center unit of the invention;

FIGS. 7A to 7F are respectively waveform diagrams of various signals which are transmitted from the center unit to the terminal units through the down-link in accordance with the invention;

FIGS. 8A to 8E are respectively waveform diagrams of different phases of a PN code which is generated in a receiver section of the center unit of the invention; and FIG. 9 is a graph of an auto-correlation function of the different phases shown in FIGS. 8A to 8E.

DESCRIPTION OF THE PREFERRED EMBODIMENT

Figure 1:
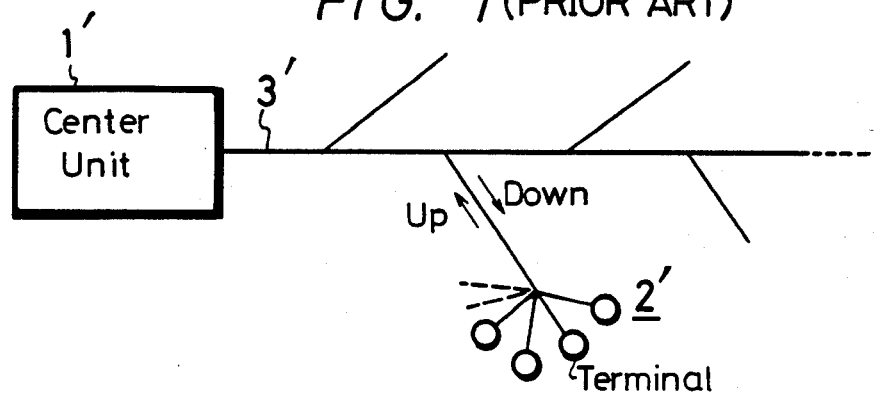
FIG. 1 is a schematic circuit diagram of a bidirectional digital signal communication system typical of the prior art.

FIG. 1 schematically illustrates a bidirectional digital signal communication system representative of the prior art. A center unit 1' on the one hand and each of terminal units 2' on the other interchange a digital data signal through a transmission line or cable 3' of, for example, a CATV system. The network line from the center unit 1' to the terminal units 2' is referred to as a down-link, while the network line from the terminal units 2' to the center unit 1' is referred to as an up-link. A data signal to be transmitted through the down-link generally has a frequency band higher than that of a data signal to be transmitted through the up-link. For example, the down-link data signal may have a frequency band of 50 MHz to 450 MHz, while the up-link data signal may have a frequency band of 5 MHz to 30 MHz.

Figure 2:
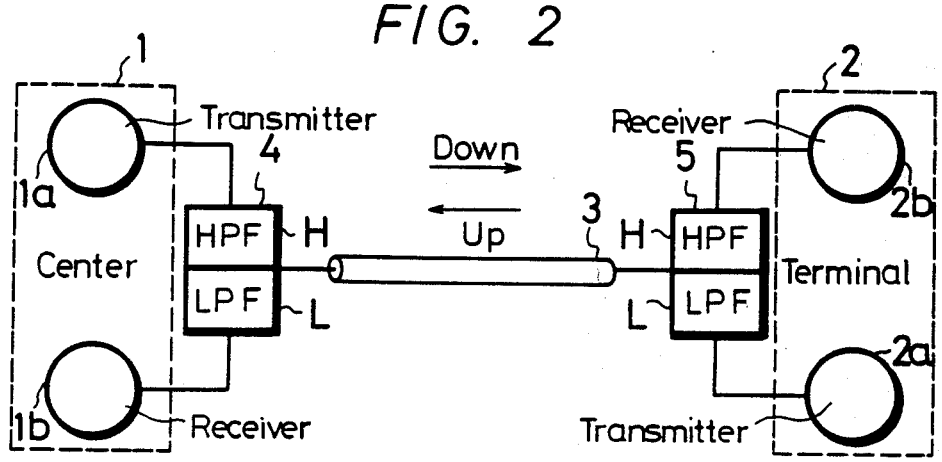
FIG. 2 is a circuit block diagram of a preferred embodiment of a bidirectional digital signal communication system constructed in accordance with the present invention.

FIG. 2 schematically illustrates a center unit 1 and a representative terminal unit 2 of a bidirectional digital signal communication system constructed in accordance with the invention. The center unit 1 comprises a transmitter 1a and a receiver 1b, and the terminal unit 2 comprises a transmitter 2a and a receiver 2b. The transmission data signal from the transmitter 1a of the center unit 1 is supplied through a high-pass filter H of a filter 4 and a transmission line or cable 3 to the terminal unit 2. It then passes through a high-pass filter H of a filter 5 and is received and demodulated by the receiver 2b of the terminal unit 2. The data signal from the transmitter 2a of the terminal unit 2 is supplied through a low-pass filter L of the filter 5 and the transmission cable 3 to the center unit 1. It then passes through a low-pass filter L of the filter 4 and is received and demodulated by the receiver 1b of the center unit 1. These are the fundamental operations which are carried out in the bidirectional digital signal communication system.

In the case of transmission of a data signal through up-link, in order to prevent deterioration of the S/N (signal-to-noise) ratio due to heat generated by a resistor in the last stage of the terminal unit 2, etc., the data signal and a PN code are first multiplied with each other. That is, the data is encoded in a spread spectrum. The encoded data is then transmitted in the form, for example, of a PSK-modulated signal.

In the down-link, the signal may be PSK-modulated or may be modulated by frequency shift keying, amplitude shift keying, etc.

In the center unit 1, data from each of the terminal units 2 is collected by interrogating the terminal unit 2 of each subscriber in a process generally called "polling". The data collected may relate to the "ON" or "OFF" status of subscribers' television receivers, selected channel information, etc.

FIGS. 3A to 3C respectively illustrate examples of various signals transmitted through the down-link. FIG. 3A illustrates an example of a bit clock with the frequency $f_b$; FIG. 3B illustrates an example of the data, including frame synchronizing signals; and FIG. 3C illustrates an example of a frame synchronizing pulse included in the frame synchronizing signals of FIG. 3B. The data transmitted through the down-link is used in the polling of each terminal unit 2, and since each terminal unit 2 is always in the demodulation mode, the bit clock and the frame synchronizing pulse are continuously reproduced at each of the terminal units 2. The center unit 1 and each of the termial units 2 thus have a bit clock and a frame synchronizing pulse which are identical in frequency but different in phase because of the propagation delay time, which depends mainly on the length of the transmission cable 3 but also on environmental factors such as temperature.

In a bidirectional digital signal communication system using a spread spectrum, it is necessary that the receiver 1b of the center unit 1 accurately synchronize the position (phase) of a code pattern of a received signal and the pulse repetition rate or frequency of the bit clock, both of which are transmitted from the terminal unit 2, with those of the reference signal in the receiver 1b of the center unit 1.

However, the process of synchronization requires a predetermined time; and, if the synchronization process is carried out each time the polling of the terminal unit 2 is conducted by the center unit 1, the amount of data receivable from the terminal units 2 is substantially reduced, so that the transmission efficiency is lowered.

FIGS. 4 to 9 illustrate the structure and function of a preferred embodiment of apparatus in accordance with the invention.

Figure 4:
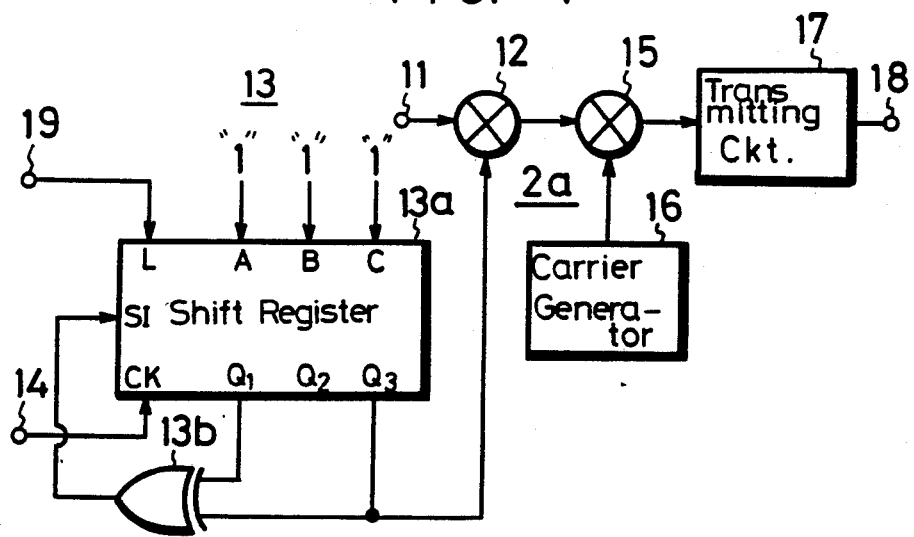
FIG. 4 is a circuit block diagram of a preferred embodiment of a transmitter section in a representative terminal unit of the invention.

FIG. 4 shows the transmitter 2a provided in each terminal unit 2. In FIG. 4, reference numeral 11 designates an input terminal to which a data signal is supplied. The data supplied to the input terminal 11 may represent the "ON" or "OFF" status of the associated television receiver, selected channel information, etc. The signal data at the input terminal 11 is supplied to one input terminal of a multiplier 12. The multiplier 12 is supplied at the other input terminal thereof with a PN (pseudo-noise) code (see FIG. 5C) produced from an output terminal $Q_3$ of an M-sequence code generator 13 which is used as a PN code generator. The generator 13 includes a shift register 13a that is shifted by a clock signal (see FIG. 5B, which is not to the same scale as FIG. 3A) with frequency of $n/m \times f_b$ (m and n are each integers). As a result, the multiplier 12 produces at its output a data signal spread with the PN code. This data signal is supplied to one input terminal of a multiplier 15. The multiplier 15 is supplied at its other input terminal with a carrier which is generated by a carrier generator 16. The data is thus modulated on the carrier. The modulated data signal from the multiplier 15 is supplied to and amplified by a transmitting circuit 17, which transmits the amplified signal from an output terminal 18 over a transmission cable 3 or the like (FIG. 2) to the receiver 1b of the center unit 1.

If N is the number of stages of the shift register in the M-sequence code generator 13 serving as the PN-code generator, $2^N - 1$ bits is the length of the maximum sequence generated. The shift register 13a in the M-sequence code generator 13 is formed of D-type flip-flops of, for example, three stages and a logic circuit which feeds back a logic value representative of the state of predetermined stages to the input terminal SI of the shift register 13a. The logic circuit comprises an exclusive-OR gate 13b (hereinafter referred to as an XOR gate) having inputs connected (in the example) to the $Q_1$ and $Q_3$ outputs of the shift register 13a. As explained in connection with the table below, the M-sequence code generator 13 generates a modulo-7 M-sequence code in which one cycle is represented as "1110100" (FIG. 5C). The "velocity" of the PN code, or the frequency of the clock signal supplied from a terminal 14 to the clock terminal CK of the shift register 13a, is set at $n/m \times f_b$, and the initial phase of the PN code is set at a time determined by the frame synchronizing pulse (FIG. 5A) which is supplied from a terminal 19 to the load terminal L of the shift register 13a.

More specifically, during a period in which the frame synchronizing pulse (FIG. 5A) is supplied from the terminal 19 to the load terminal L of the shift register 13a, the clock signal (FIG. 5B) is supplied from the terminal 14 to the clock terminal CK of the shift register 13a. In synchronism with an edge, for example the rising edge, of the clock signal, a predetermined preset signal, for example "111", is set at preset terminals A, B and C of the shift register 13a. Thus, the frame synchronizing pulse and the PN code of the M-sequence code generator 13 coincide with each other in phase, as FIG. 5 shows. Times $t_1$ and $t_2$ are respectively times when the shift register 13a is preset by the frame synchronizing pulse as described above.

The output of an XOR gate output is high if one and only one input is high. Otherwise, the output of an XOR gate is low. the states of the $Q_1$, $Q_2$, $Q_3$ outputs of the shift register 13a and of the inputs and outputs of XOR gate 13b are therefore as shown in the following table:

TABLE

| | States of $Q_1$, $Q_2$, $Q_3$ | Inputs to XOR gate 13b | Output to XOR gate 13b |
|---|---|---|---|
| Initial | 111 | 1,1 | 0 |
| after clock pulse 1 | 011 | 0,1 | 1 |
| after clock pulse 2 | 101 | 1,1 | 0 |
| after clock pulse 3 | 010 | 0,0 | 0 |
| after clock pulse 4 | 001 | 0,1 | 1 |
| after clock pulse 5 | 100 | 1,0 | 1 |
| after clock pulse 6 | 110 | 1,0 | 1 |
| after clock pulse 7 | 111 | 1,1 | 0 |

As the table and FIG. 4 indicate, the successive outputs of the XOR gate 13b are shifted into the SI terminal of the unit register 13a and through the shift register 13a one stage at a time with each clock pulse supplied from the terminal 14 to the input terminal CK.

Thus after seven clock pulses the shift register 13a is returned to its initial state. The $Q_3$ output thereof therefore repeatedly produces the output 1110100, as shown in the table and in FIG. 5C.

The data spread with the PN code is transmitted over the up-link 3 to the center unit 1 in which it is de-spread from the PN code and then demodulated to the original data.

FIG. 6 shows a preferred embodiment of the circuit arrangement of the center unit 1. The center unit comprises the transmitting section 1a and the receiving section 1b briefly described above in connection with FIG. 2. The transmitting section 1a includes a data generator 23 and a frame synchronizing signal generator 24. A data signal (FIG. 7D) and a frame synchronizing signal (FIG. 7C) are respectively extracted from the data generator 23 and the frame synchronizing signal generator 24 by a bit clock (see FIG. 7A, which is not to the same scale as FIG. 5B) with frequency $f_b$ generated by a timing signal generator 26. The data signal and frame synchronizing signal thus extracted are supplied to a multiplexer 25. The multiplexer 25 is switched between the data signal and the frame synchronizing signal by a switching signal (FIG. 7E) generated by the timing signal generator 26 and produces a signal (FIG. 7B) which then is supplied to a PSK-modulator 27. The signal from the multiplexer 25 as modulated by the PSK-modulator 27 is supplied through a high-pass filter portion H of the filter 4 and transmitted over the transmission cable to the terminal unit as described above.

A data signal received by the center unit from the terminal unit is supplied through a low-pass filter portion L of the filter 4 to one input terminal of a multiplier 29. The other input terminal of the multiplier 29 is supplied with a PN code for de-spreading the data transmitted from the terminal unit. The output from the multiplier 29 is supplied to a demodulator 30, and the data demodulated thereby is supplied to an output terminal 31. Thereafter, though not shown, the demodulated output is supplied to a level control circuit in which the level control of "1" and "0" is carried out on the basis of a bit clock which is reproduced from the demodulated output. The transmitted data is thus restored to the original data.

The receiving section 1b is provided with an M-sequence code generator 32 comprising a shift register 32a and an XOR gate 32b. The generator 32a is similar to the M-sequence code generator 13 (FIG. 4) of the terminal unit. Preset data of 3 bits is set in preset terminals A, B and C of the shift register 32a by a control circuit 33 at a time determined by a frame synchronizing pulse $P_F$ (FIG. 7F) generated by the timing signal generator 26. The control circuit 33 is operated so that when the detection level of a level detector 35 connected to the output of the multiplier 29 becomes maximum, the data then appearing at the preset terminals A, B and C of the shift register 32a is stored in a memory 34. The data so stored is used as an address for the succeeding polling of the terminal unit. During such succeeding polling, the address data stored in the memory 34 is read out and supplied via the controller 33 to the shift register 32a thereby presetting the shift register 32a so that the time necessary for establishing synchronization is reduced. Since the shift register 32a is shifted by a clock signal with the frequency $n/m \times f_b$ produced by the timing signal generator 26, a PN signal as shown in FIG. 8A is developed at its output terminal $Q_3$.

Further, since the transmission delay time between the center unit and the terminal unit can assume (within limits) a random value, not only must the sequence of the received and locally generated PN codes be matched with each other, but also a fine phase adjustment must be made to compensate for the time required for the transmission of the received PN code. For this reason, a shift register 36 which is formed of D-type flip-flop circuits arranged in four stages is connected to the output of the shift register 32a. The shift register 36 is shifted by a clock signal with a frequency of $4n/m \times f_b$ generated by the timing signal generator 26. The outputs from the terminals $Q_1$, $Q_2$, $Q_3$ and $Q_4$ of the shift register 36 are respectively shown in FIGS. 8B to 8E. Successive ones of these outputs are phase shifted by an amount equal to one-fourth of a bit and are respectively supplied to a switching circuit 37. The switching circuit 37 has preset terminals D and E and, after the switching circuit 37 is preset by the controller 33, the state of the switching circuit 37 is changed on the basis of the address data.

Accordingly, relative to the data spread with the PN code supplied to one input terminal of the multiplier 29, the phase of the PN code supplied to the other input terminal of the multiplier 29 is displaced in turn as shown in FIG. 8. This is accomplished as the controller 33 sequentially switches the switching circuit 37. The PN code produced by the switching circuit 37 is supplied to the second input terminal of the multiplier 29, and the signals supplied to the two input terminals of the multiplier 29 are multiplied with each other. The output of the multiplier 29 is then detected by the level detector 35, and the value of the data to be preset in the shift register 32a and the switching circuit 37 in order to maximize the level of the output from the multiplier 29 is stored in the memory 34 as an address to be used on the next occasion when polling in accordance with the serial number of each terminal unit and under the control of the controller 33 is carried out.

When polling is carried out after the above-described processing is completed for all of the terminal units, the controller 33 causes the appropriate address data from the memory 34 to be set in the shift register 32a and the switching circuit 37. The locally generated PN code (derived from the switching circuit 37 as described above) and the data from each terminal unit are multiplied with each other in the multiplier 29. That is, the locally generated PN code is delayed by a time sufficient to eliminate or minimize the phase difference between it and the identical PN code which is transmitted from the terminal unit. Thus, the time required for establishing the synchronization is reduced.

Since the phase of the PN code can be adjusted in increments of $\frac{1}{4}$ bit as mentioned above, the maximum correlation loss $$CL_{max} \text{ is } 20 \log \left(1 - \frac{1}{8}\right) = 1.15 \text{ (1.15dB)},$$

as shown in FIG. 9. This loss is minor and causes no particular problem. Since the sequence and the phase of the PN code corresponding to each terminal unit are stored in the center unit (broadcasting station side), synchronization can be established at high speed.

The above-described synchronization establishment and the writing of the sequence and phase of the PN code in the memory can be carried out several times a day for the purpose of compensating for changes in the delay time due to external factors such as temperature and so on.

In accordance with the invention, the data spread with the PN code is transmitted at least over the up-link, on the basis of the synchronizing signal transmitted over the down-link. The PN code of the maximum level and the data corresponding to the phase thereof in the up-link are stored in the memory 34 and thereafter used as the address data for each terminal unit during the next polling procedure so that the time required to establish synchronization is reduced and the data is transmitted efficiently.

Thus there is provided in accordance with the invention a novel and highly-effective bidirectional digital signal communication system especially adapted for use in transmitting a digital signal through a CATV (cable television) transmission line and similar communication links.

Many modifications of the preferred embodiment of the invention described above will readily occur to those skilled in the art upon consideration of this disclosure. For example, the phase of the PN code can be adjusted by the switching circuit 37 in increments other than $\frac{1}{4}$ bit, thereby adjusting the maximum correlation loss. Accordingly, the invention is to be construed as including all structure that falls within the scope of the appended claims.

We claim as our invention:

1. A bidirectional digital signal communication system including a plurality of terminal units in communication with a center unit, wherein each of said terminal units comprises:

signal generating means for generating digital data spread with a pseudo-noise code;

modulating means for modulating said digital data on a carrier; and means for transmitting said modulated digital signal to said center unit;

and said center unit comprises:

receiving means for receiving said modulated digital signal;

a pseudo-noise code generator for generating a pseudo-noise code which corresponds to the pseudo-noise code of one of said terminal units;

a multiplier responsive to said receiving means and said pseudo-noise code generator to produce a digital signal de-spread from said pseudo-noise code;

demodulating means connected to said multiplier to reproduce the digital data from said modulated digital signal;

a detector for detecting a maximum level of the digital signal from said multiplier and producing a corresponding level indication signal; and presetting means including a memory containing a preset code for presetting said pseudo-noise code generator with said preset code in response to said level indication signal.

2. A bidirectional digital signal communication system according to claim 1; in which said pseudo-noise code generator comprises a shift register and an exclusive-OR gate, said shift register having a signal input terminal, a plurality of Q output terminals, and preset input terminals receiving said preset code and said exclusive-OR gate being responsive to said Q output terminals and supplying a signal to said signal input terminal, whereby said shift register generates said pseudo-noise code.

3. A bidirectional digital signal communication system according to claim 2; in which said pseudo-noise code is an M-sequence code.

4. A bidirectional digital signal communication system according to claim 3; further comprising another shift register for producing a plurality of phase-shifted pseudo-noise code signals and switching means connected to said other shift register and selectively supplying one of said plurality of phase-shifted pseudo-noise code signals to said multiplier.

5. A bidirectional digital signal communication system according to claim 4; in which the switching position of said switching means is stored in said memory.

6. A bidirectional digital signal communication system according to claim 4; further comprising means for supplying said shift register and said other shift register with respective clock signals, the clock signal supplied to said other shift register having a frequency which is higher than that of the clock frequency supplied to said shift register.

7. A bidirectional digital signal communication system according to claim 1; further comprising a transmission line connecting said terminal units with said center unit.

8. A bidirectional digital signal communication system according to claim 1; further comprising a cable television transmission line connecting said terminal units with said center unit.

9. A bidirectional digital signal communication system according to claim 1; in which said modulating means produces a phase-shift keying modulated carrier.

10. A bidirectional digital signal communication system according to claim 1; in which said demodulating means comprises a phase-shift keying demodulator.

11. A bidirectional digital signal communication system according to claim 2, in which said presetting means further includes control means responsive to said level indication signal and connected to said memory and said preset input terminals of said shift register for controlling said memory to store a value present at said preset input terminals at the occurrence of said level indication signal for presetting said shift register at a next successive operational cycle.

* * * * *